(12) United States Patent
Ootorii

(10) Patent No.: US 9,188,746 B2
(45) Date of Patent: Nov. 17, 2015

(54) OPTICAL FIBER COMPONENT, MANUFACTURING METHOD THEREOF, OPTICAL FIBER AND LENS SUBSTRATE ASSEMBLY, AND MANUFACTURING METHOD THEREOF

(75) Inventor: Hiizu Ootorii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 642 days.

(21) Appl. No.: 13/367,861

(22) Filed: Feb. 7, 2012

(65) Prior Publication Data
US 2012/0224809 A1 Sep. 6, 2012

(30) Foreign Application Priority Data

Mar. 4, 2011 (JP) ................... 2011-047343

(51) Int. Cl.
*G02B 6/32* (2006.01)
*G02B 6/42* (2006.01)
(52) U.S. Cl.
CPC ............. *G02B 6/32* (2013.01); *G02B 6/4239* (2013.01); *G02B 6/4244* (2013.01); *Y10T 156/1052* (2015.01)

(58) Field of Classification Search
CPC ..................................... G02B 6/4244
See application file for complete search history.

(56) References Cited

U.S. PATENT DOCUMENTS

| 2003/0081930 | A1* | 5/2003 | Filhaber et al. | 385/147 |
| 2006/0198576 | A1* | 9/2006 | Furusawa et al. | 385/24 |
| 2013/0011102 | A1* | 1/2013 | Rinzler et al. | 385/89 |

FOREIGN PATENT DOCUMENTS

JP 2008-164795 7/2008

* cited by examiner

*Primary Examiner* — Tina Wong
*Assistant Examiner* — Chad Smith
(74) *Attorney, Agent, or Firm* — Dentons US LLP

(57) ABSTRACT

An optical fiber and lens substrate assembly includes: an optical fiber component including an optical fiber core wire, and an end-surface-fixing resin block in which the optical fiber core wire is embedded, and cross section of an optical fiber element wire and a secondary coating that constitute the optical fiber core wire are exposed to a smooth surface thereof; and a lens substrate attached to the smooth surface of the end-surface-fixing resin block.

6 Claims, 5 Drawing Sheets

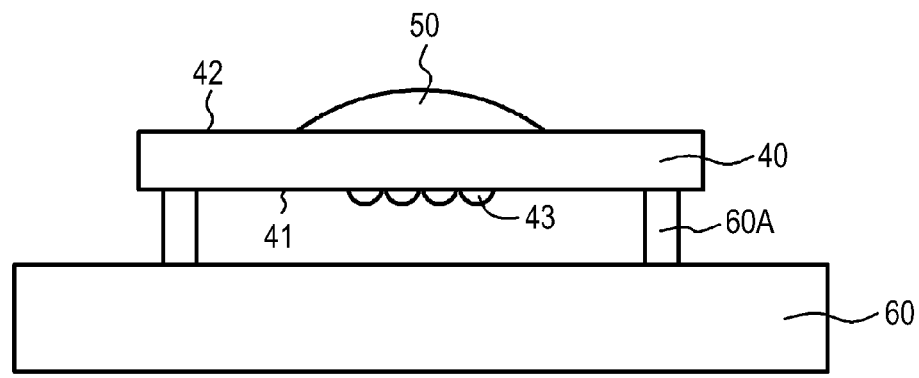
FIG. 3A
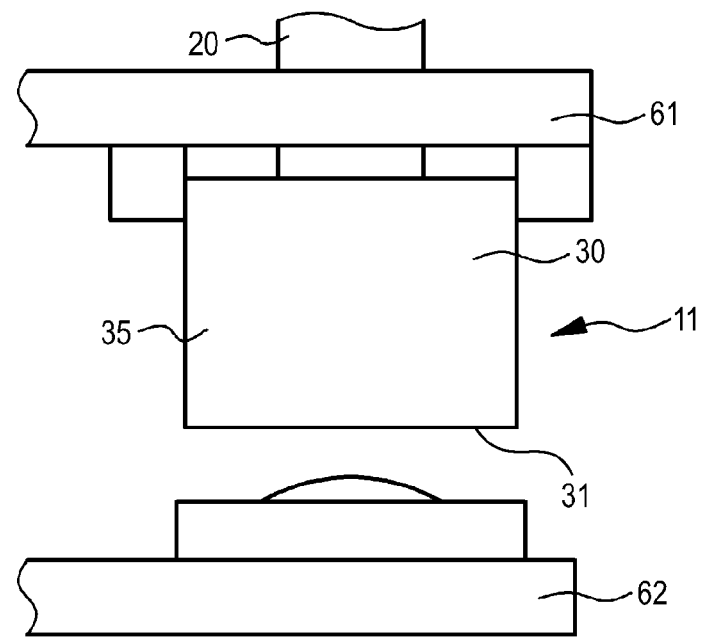
FIG. 3B
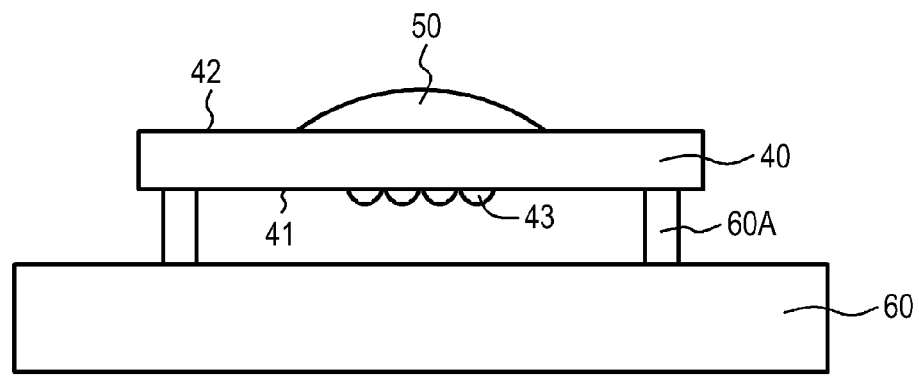

OPTICAL FIBER COMPONENT, MANUFACTURING METHOD THEREOF, OPTICAL FIBER AND LENS SUBSTRATE ASSEMBLY, AND MANUFACTURING METHOD THEREOF

FIELD

The present disclosure relates to an optical fiber component, a manufacturing method thereof, an optical fiber and lens substrate assembly, and a manufacturing method thereof.

BACKGROUND

When controlling light emitted from or entering an optical fiber core wire in which one or a plurality of optical fiber element wires is coated with a secondary coating, an optical connector including a lens substrate on which lenses are formed is often used. In such an optical connector, it is necessary to align the center of a lens with respect to the center of the core (a light guiding region called a bare optical fiber) of an optical fiber core wire with high accuracy. In general, the optical fiber core wire is fixed to the optical connector in a state where a secondary coating of an optical fiber which has low rigidity and of which the shape accuracy is not secured is removed. Specifically, the secondary coating of about 10 mm from the end of the optical fiber core wire is removed to expose the optical fiber element wire (core and cladding portion), and the optical fiber element wire (generally having a diameter of 125 µm) manufactured with high accuracy is inserted into a hole or laid on a V-groove (for example, see JP-A-2008-164795) processed with high accuracy. In this way, alignment of a core (generally having a diameter of 50 µm) is performed.

SUMMARY

However, in the above alignment method, it is necessary to perform alignment of the optical fiber core wire with respect to the optical fiber component that constitutes the optical connector in a state where the secondary coating is removed and fragile optical fiber element wires are exposed. Such an operation is a very delicate operation, and it is very difficult to automate a process of assembling the optical connector. The assembling process occupies a large proportion of the entire manufacturing cost. Moreover, since the operation is performed in a state where the weak optical fiber element wires are exposed, the exposed optical fiber element wires are likely to be damaged.

It is therefore desirable to provide an optical fiber component and an optical fiber and lens substrate assembly which constitute an optical connector, for example, and which are hardly damaged, and which can be manufactured in an automated manner with a reduced manufacturing cost, and to provide a manufacturing method thereof.

An embodiment of the present disclosure is directed to an optical fiber component including an optical fiber core wire, and an end-surface-fixing resin block in which the optical fiber core wire is embedded, and cross sections of an optical fiber element wire and a secondary coating that constitute the optical fiber core wire are exposed to a smooth surface thereof.

Another embodiment of the present disclosure is directed to an optical fiber and lens substrate assembly including an optical fiber component which includes an optical fiber core wire, and an end-surface-fixing resin block in which the optical fiber core wire is embedded, and cross sections of an optical fiber element wire and a secondary coating that constitute the optical fiber core wire are exposed to a smooth surface thereof, and a lens substrate attached to the smooth surface of the end-surface-fixing resin block.

Still another embodiment of the present disclosure is directed to a method of manufacturing an optical fiber component, including inserting and fixing an optical fiber core wire to an end-surface-fixing resin block (or embedding an optical fiber core wire in an end-surface-fixing resin block), cutting the end-surface-fixing resin block at an imaginary plane orthogonal to an axial direction of the optical fiber core wire, performing a smoothing process on the cutting surface to obtain a smooth surface, and exposing cross sections of an optical fiber element wire and a secondary coating that constitute the optical fiber core wire to the smooth surface.

Yet another embodiment of the present disclosure is directed to a method of manufacturing an optical fiber and lens substrate assembly, including inserting and fixing an optical fiber core wire to an end-surface-fixing resin block (or embedding an optical fiber core wire in an end-surface-fixing resin block), cutting the end-surface-fixing resin block at an imaginary plane orthogonal to an axial direction of the optical fiber core wire, performing a smoothing process on the cutting surface to obtain a smooth surface, exposing cross sections of an optical fiber element wire and a secondary coating that constitute the optical fiber core wire to the smooth surface, and attaching the smooth surface of the end-surface-fixing resin block to a lens substrate.

In the embodiments of the present disclosure, unlike the related art in which an optical fiber element wire (core and cladding portion) is exposed, and an optical fiber core wire is fixed to an optical fiber component, the optical fiber core wire is embedded in an end-surface-fixing resin block. Thus, it is easy to handle an optical fiber element wire, and it is possible to automate the manufacturing process and to reduce the manufacturing cost. Moreover, the optical fiber core wire is hardly damaged.

BRIEF DESCRIPTION OF THE DRAWINGS

FIGS. 3A and 3B are conceptual diagrams of an assembling apparatus or the like, illustrating a method of manufacturing the optical fiber and lens substrate assembly according to the first embodiment.

DETAILED DESCRIPTION

Figure 1A:
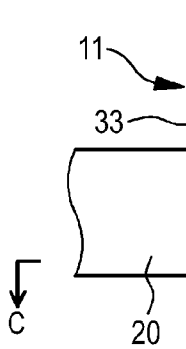
FIG. 1A is a schematic plan view of an optical fiber component according to a first embodiment of the present disclosure.

Hereinafter, although the present disclosure will be described based on embodiments with reference to the drawings, the present disclosure is not limited to the embodiments, and various numerical values and materials mentioned in the embodiments are exemplary.

The description will be given in the following order.

1. Overall description of optical fiber component, manufacturing method thereof, optical fiber and lens substrate assembly, and manufacturing method thereof according to the present disclosure
2. First embodiment (optical fiber component, manufacturing method thereof, optical fiber and lens substrate assembly, and manufacturing method thereof)
3. Second embodiment (modification of first embodiment), and the like <Overall Description of Optical Fiber Component, Manufacturing Method Thereof, Optical Fiber and Lens Substrate Assembly, and Manufacturing Method Thereof According to the Present Disclosure>

In the following description, an optical fiber core wire means one in which one or a plurality of optical fiber element wires is coated with a secondary coating made from a resin material. An optical fiber element wire means one which is generally formed of the same material such as glass or plastic, and in which a central portion having a slightly high refractive index is a core, and the core is surrounded by a cladding. In the present disclosure, the known configuration and structure of an optical fiber core wire may be used.

In an optical fiber and lens substrate assembly of an embodiment of the present disclosure or a method of manufacturing the optical fiber and lens substrate assembly of an embodiment of the present disclosure, a smooth surface of an end-surface-fixing resin block and a lens substrate may be attached by an adhesive agent. Here, as the adhesive agent, a known ultraviolet-curable adhesive agent or a known heat-curable adhesive agent that is transparent to light passing through an optical fiber element wire may be used. For example, an adhesive agent made from a silicon resin, an acrylic resin, a urethane resin, an epoxy resin, or the like can be used. In this case, the adhesive agent preferably has approximately the same refractive index as an optical fiber. Specifically, if the refractive index of a core material is $n_C$, and the refractive index of the adhesive agent is $n_A$, a relation of $|n_C-n_A|\leq 0.2$, preferably, $|n_C-n_A|\leq 0.1$, is satisfied. By doing so, even when very small damage (cracks, irregularities, or the like) occurs in an optical fiber element wire or a core, since a damaged portion is filled with the adhesive agent, no adverse effect may occur due to damage.

In an optical fiber and lens substrate assembly of the present disclosure, a method of manufacturing the optical fiber and lens substrate assembly of the present disclosure, an optical fiber component of the present disclosure, or a method of manufacturing the optical fiber component of the present disclosure including the preferred embodiment described above, although the optical fiber core wire may be formed of a tape core wire, the present disclosure is not limited to this. Moreover, the number of optical fiber element wires in the optical fiber component and the number of optical fiber element wires that constitute the tape core wire are not particularly limited.

In an optical fiber and lens substrate assembly of the present disclosure, a method of manufacturing the optical fiber and lens substrate assembly of the present disclosure, an optical fiber component of the present disclosure, or a method of manufacturing the optical fiber component of the present disclosure including the preferred embodiment described above, the root-mean-square roughness Rq (JIS B0601: 2001) of the smooth surface may be 0.1 µm or more. In other words, no problem occurs with a surface roughness more coarse than the surface roughness of the end surface of the known optical fiber. The upper limit of Rq may be 0.5 µm as an example.

In a method of manufacturing the optical fiber and lens substrate assembly of the present disclosure including the preferred embodiment described above, the attaching of the smooth surface of the end-surface-fixing resin block to the lens substrate may include grasping the end-surface-fixing resin block with a moving arm, positioning the end-surface-fixing resin block at a desired position above the lens substrate placed on an assembling table by moving the moving arm and operating an alignment camera, moving the moving arm downward to bring the end-surface-fixing resin block into contact with the lens substrate on which an adhesive agent is applied, and curing the adhesive agent.

In an optical fiber and lens substrate assembly of the present disclosure, a method of manufacturing the optical fiber and lens substrate assembly of the present disclosure, an optical fiber component of the present disclosure, or a method of manufacturing the optical fiber component of the present disclosure including the preferred embodiment described above (these embodiments are sometimes collectively referred to simply as "present disclosure"), the resin that constitutes the end-surface-fixing resin block may be a known thermo-curable resin, and for example, the end-surface-fixing resin block may be manufactured and molded by an injection molding method. After manufacturing an end-surface-fixing resin block including one or a plurality of through holes, the optical fiber core wire may be inserted into the through hole. The end-surface-fixing resin block may be formed of two members, for example, and these two members may be attached with the optical fiber core wire disposed between these two members. The end-surface-fixing resin block and the optical fiber core wire may be integrally molded. The outer shape of the end-surface-fixing resin block is not particularly limited, and may be a rectangular solid, for example. In this case, the optical fiber core wire may linearly extend from the smooth surface of the end-surface-fixing resin block to a surface facing the smooth surface. Alternatively, in this case, the optical fiber core wire may extend from a smooth surface that forms the side surface of the end-surface-fixing resin block to a bottom surface or a front surface, or from a smooth surface that forms the side surface of the end-surface-fixing resin block to a side surface adjacent to the smooth surface, while changing its angle in the inner side of the end-surface-fixing resin block. Alternatively, the optical fiber core wire may employ a mixture of the above embodiments. The lens substrate in which the same number of lenses as the optical fiber core wires are formed may have a known configuration and structure. For example, a substrate in which plastic molded microlenses are formed may be used as the lens substrate. For example, an optical connector or a commonly called ferrule is formed from the optical fiber component according to the present disclosure.

First Embodiment

Figure 1B:
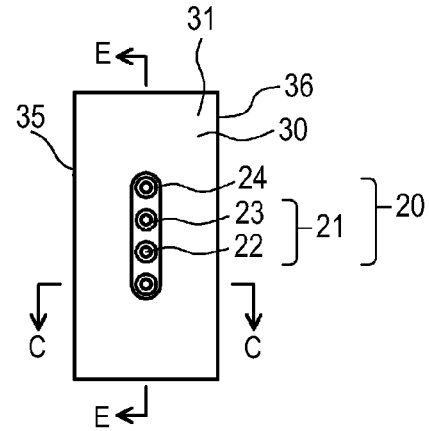
FIG. 1B is a schematic front view.
Figure 1C:
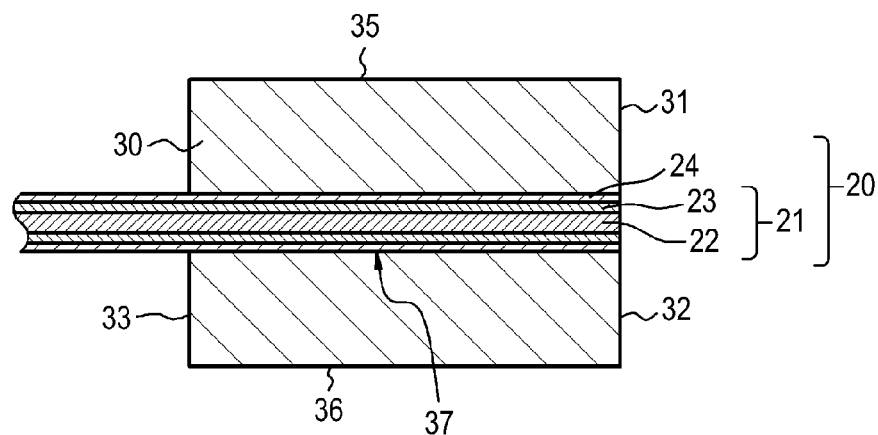
FIG. 1C is a schematic cross-sectional view taken along the arrow C-C in FIGS. 1A and 1B.
Figure 1D:
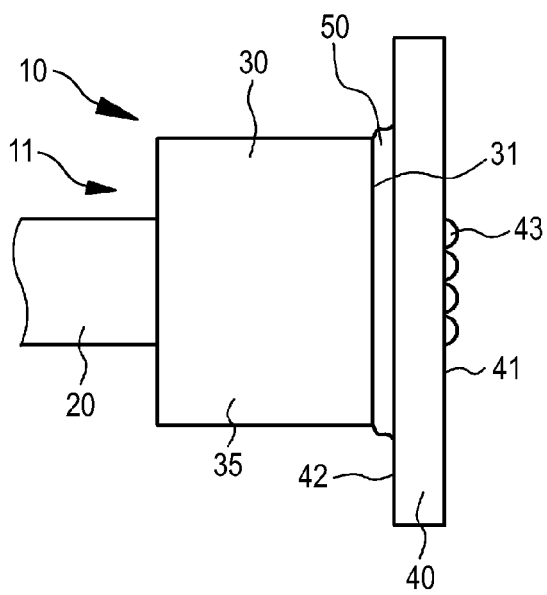
FIG. 1D is a schematic plan view of an optical fiber and lens substrate assembly according to the first embodiment.
Figure 1E:
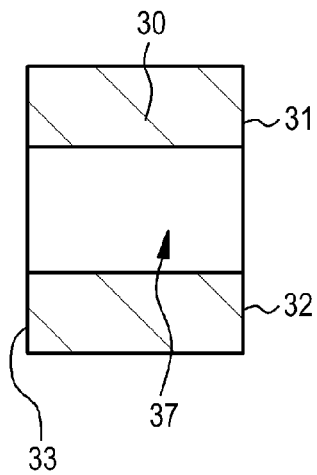
FIG. 1E is a schematic cross-sectional view taken along the arrow E-E in FIG. 1B, of the optical fiber component according to the first embodiment.

The first embodiment relates to an optical fiber component, a manufacturing method thereof, an optical fiber and lens substrate assembly, and a manufacturing method thereof according to the present disclosure. FIG. 1A shows a schematic plan view (schematic top view) of an optical fiber component according to the first embodiment, FIG. 1B shows a schematic front view (schematic view as seen from the direction of arrow B in FIG. 1A), and FIG. 1C shows a schematic enlarged cross-sectional view taken along the arrow C-C in FIGS. 1A and 1B. FIG. 1D shows a schematic plan view of an optical fiber and lens substrate assembly, and FIG. 1E shows a schematic cross-sectional view of the optical fiber component, taken along the arrow E-E in FIG. 1B.

An optical connector or a commonly called ferrule is formed from an optical fiber component 11 of the first embodiment, and the optical fiber component 11 includes an optical fiber core wire 20, and an end-surface-fixing resin block 30 in which the optical fiber core wire 20 is embedded, and cross sections of an optical fiber element wire 21 and a secondary coating 24 that constitute the optical fiber core wire 20 are exposed to a smooth surface 31 thereof.

Moreover, an optical fiber and lens substrate assembly 10 of the first embodiment includes the optical fiber component 11 of the first embodiment, and a lens substrate 40 attached to the smooth surface 31 of the end-surface-fixing resin block 30.

In the first embodiment, the optical fiber core wire 20 is embedded in the end-surface-fixing resin block 30. The optical fiber core wire 20 is made up of a tape core wire of a 4-channel array, for example. The tape core wire has a width of about 1.25 mm and a height of about 0.4 mm, and a cross-sectional shape thereof is an elongated hole shape. The optical fiber core wire 20 formed of the tape core wire has a known configuration and structure. Specifically, the optical fiber element wire 21 includes a core 22 (for example, diameter: 50 μm) made from quartz glass (refractive index $n_C$=1.5) and a cladding 23 (for example, diameter: 125 μm), for example. Four cores 22 are arranged in a line at a pitch of 250 μm, and the secondary coating 24 is formed of a resin material. The end-surface-fixing resin block 30 is molded from a thermo-plastic resin by an injection molding method. A plurality of lenses 43 formed of a plastic molded microlens are formed on a first surface 41 of the lens substrate 40 formed of a transparent molding resin having a refractive index $n_A$ of about 1.4 to about 1.6, and a second surface 42 facing the first surface 41 is a flat surface. In the first embodiment, the outer shape of the end-surface-fixing resin block 30 is a rectangular solid, and a linear through hole 37 is formed so as to extend from a smooth surface 31 corresponding to a first side surface 32 to a side surface (opposing side surface) 33 facing the smooth surface 31. The optical fiber core wire 20 extends linearly within the through hole 37 from the smooth surface 31 to the opposing side surface 33 and extends further to the outside. The size of the through hole 37 is slightly smaller than the cross section of the optical fiber core wire 20 formed of the tape core wire. Reference numeral 35 denotes the front surface of the end-surface-fixing resin block 30, and reference numeral 36 denotes the bottom surface of the end-surface-fixing resin block 30. Here, the end-surface-fixing resin block 30 molded by an injection molding method has a sufficiently satisfactory dimensional accuracy. If no fluctuation occurs in the positional relation of the cores 22, and the smooth surface 31 is approximately perpendicular (approximately within ±2°) to the optical fiber core wire 20, the shape accuracy such as the outer shape of the end-surface-fixing resin block 30 is normal, and no particular problem occurs.

In the optical fiber and lens substrate assembly 10 of the first embodiment, the smooth surface 31 of the end-surface-fixing resin block 30 and the lens substrate 40 are attached by an adhesive agent 50, specifically, an ultraviolet-curable adhesive agent 50 that is transparent to light passing through the optical fiber element wire 21. The adhesive agent 50 has approximately the same refractive index as the optical fiber (specifically, the core 22). More specifically, a relation of $|n_C - n_A| \leq 0.2$ is satisfied.

Hereinafter, a method of manufacturing the optical fiber component and a method of manufacturing the optical fiber and lens substrate assembly according to the first embodiment will be described with reference to FIGS. 2A and 2B which are schematic plan views of the end-surface-fixing resin block and the like and FIGS. 3A and 3B and FIGS. 4A and 4B which are schematic views of an assembling apparatus and the like.

[Step-100]

Figure 2A:
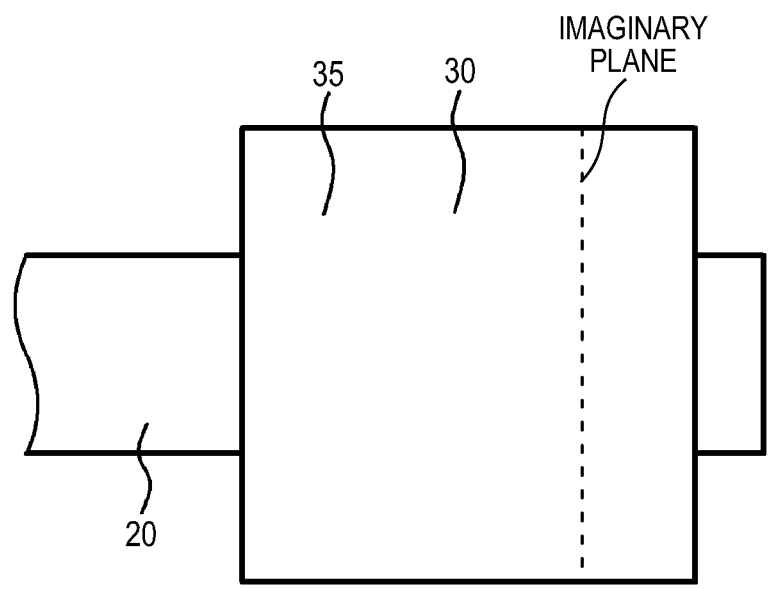
FIGS. 2A and 2B are schematic plan views of an end-surface-fixing resin block or the like, illustrating a method of manufacturing the optical fiber component and a method of manufacturing the optical fiber and lens substrate assembly according to the first embodiment.

First, the optical fiber core wire 20 is inserted and fixed to the end-surface-fixing resin block 30 formed by an injection molding method (see FIG. 2A). Specifically, after inserting the optical fiber core wire 20 formed of a tape core wire into the through hole 37 of the end-surface-fixing resin block 30, and the end-surface-fixing resin block 30 and the optical fiber core wire 20 are fixed using an adhesive agent (not shown).

Moreover, the end-surface-fixing resin block 30 and the optical fiber core wire 20 may be integrally molded by an insert injection molding method, and the optical fiber core wire 20 may be embedded in the end-surface-fixing resin block 30. Alternatively, the end-surface-fixing resin block 30 may be formed of two members, for example, and by attaching these two members with the optical fiber core wire 20 disposed between these two members, the optical fiber core wire 20 may be fixed to the end-surface-fixing resin block 30. These embodiments are also included in the embodiment of "inserting and fixing the optical fiber core wire to the end-surface-fixing resin block."

[Step-110]

Figure 2B:
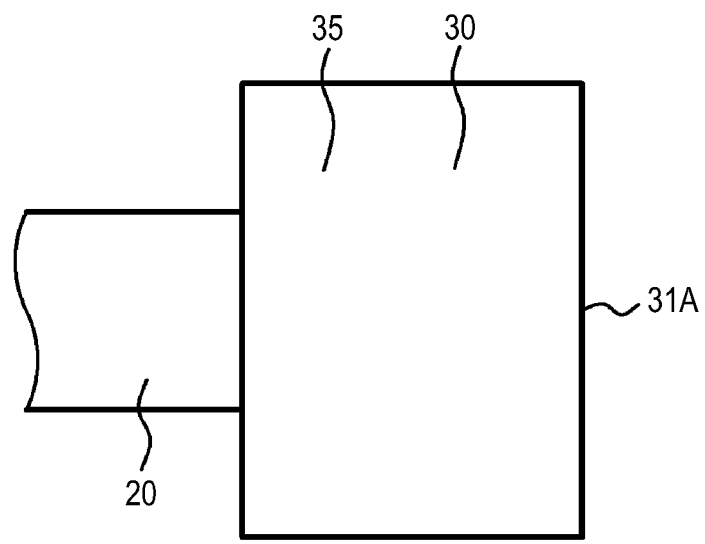
Figure 4A:
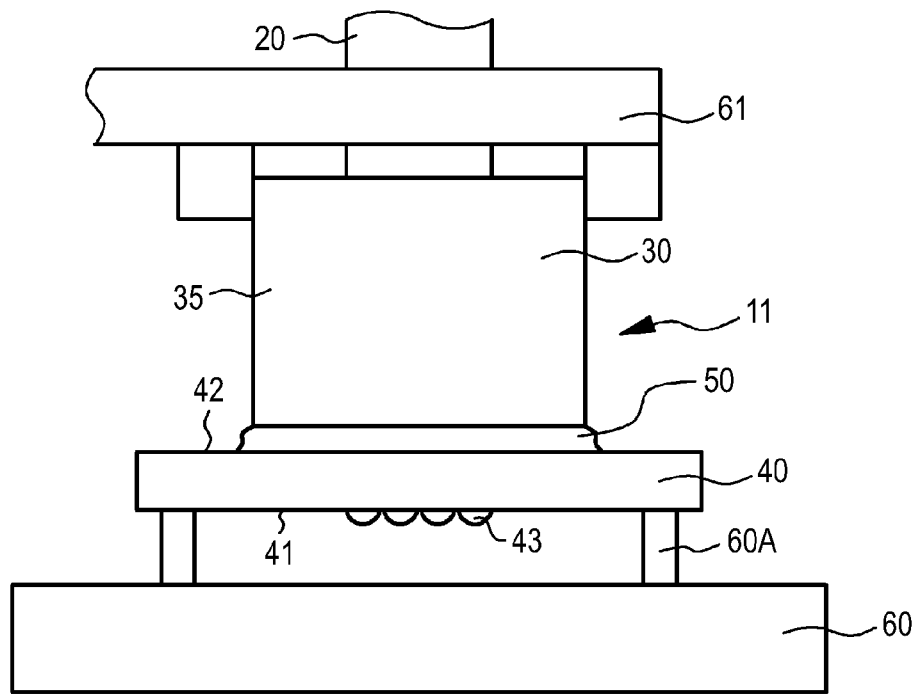
FIGS. 4A and 4B are conceptual diagrams of an assembling apparatus or the like, illustrating a method of manufacturing the optical fiber and lens substrate assembly according to the first embodiment, continuous to FIG. 3B.
Figure 4B:
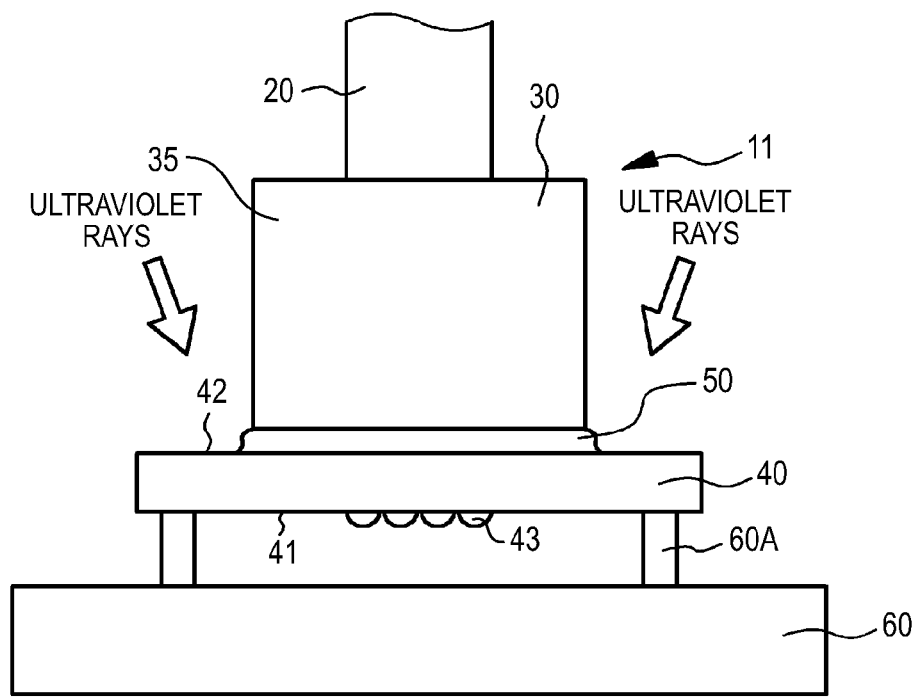

Subsequently, as shown in FIG. 2B, using a diamond cutter, for example, the end-surface-fixing resin block 30 is cut at an imaginary plane (see the dotted line in FIG. 2A) orthogonal to the axial direction of the optical fiber core wire 20. The cutting surface 31A becomes the smooth surface 31 of the end-surface-fixing resin block 30.

[Step-120]

After that, the cutting surface 31A is smoothed to obtain the smooth surface 31. Specifically, the cutting surface 31A is polished using an abrasive material. The smoothing process on the cutting surface 31A may not greatly damage the cross sections (exposed surfaces) of the optical fiber element wire 21 and the secondary coating 24 that constitute the optical fiber core wire 20. In this way, the optical fiber component 11 can be completed. To perform evaluation and test, extra coarse, coarse, medium, fine, and finish polishing processes were sequentially performed using abrasive materials.

[Step-130]

Subsequently, the smooth surface 31 of the end-surface-fixing resin block 30 is attached to the lens substrate 40 (specifically, the second surface 42 of the lens substrate 40) using the ultraviolet-curable adhesive agent 50 that is transparent to light passing through the optical fiber element wire 21. More specifically, the lens substrate 40 is fixed onto an assembling table 60 with the second surface 42 of the lens substrate 40 facing upward. Four pins 60A, for example, extending perpendicularly are arranged on the assembling table 60, and alignment through holes (not shown) formed in the lens substrate 40 are engaged with the pins 60A, whereby the lens substrate 40 can be fixed onto the assembling table 60. The adhesive agent 50 is applied onto the second surface 42 of the lens substrate 40 using a dispenser (not shown) (see FIG. 3A).

The optical fiber component 11 (specifically, the end-surface-fixing resin block 30) with the smooth surface 31 of the end-surface-fixing resin block 30 facing downward is grasped by a moving arm 61 capable of moving in the X, Y, and Z directions and changing an angle θ with respect to the horizontal surface. By the movement of the moving arm 61 and the operation of an alignment camera 62, the end-surfacefixing resin block 30 is positioned at a desired position above the lens substrate 40 placed on the assembling table 60. Specifically, by moving the moving arm 61, the end-surface-fixing resin block 30 is moved in the X, Y, and Z directions and the angle θ is adjusted while observing the cross section (exposed surface) of the optical fiber element wire 21 and the cross section (exposed surface) of the secondary coating 24 on the smooth surface 31 of the end-surface-fixing resin block 30 with the alignment camera 62. In this way, the smooth surface 31 of the end-surface-fixing resin block 30 is disposed as a desired position (see FIG. 3B). After that, the alignment camera 62 is moved in the horizontal direction, and the moving arm 61 is moved downward so that the end-surface-fixing resin block 30 is brought into contact with the lens substrate 40 on which the adhesive agent 50 is applied (see FIG. 4A). That is, the smooth surface 31 of the end-surface-fixing resin block 30 is placed on the second surface 42 of the lens substrate 40 with the adhesive agent 50 disposed therebetween. The adhesive agent 50 is irradiated with ultraviolet rays for a short period of time, whereby the ultraviolet-curable adhesive agent 50 is temporarily cured. In general, since a relative alignment accuracy of ±10 μm or less, for example, can be secured for the lenses 43 on the assembling table 60, alignment of the optical axis of the lenses 43 can be easily realized by the moving arm 61.

After that, the optical fiber component 11 is released from the moving arm 61, and the moving arm 61 is moved upward and is further moved in the horizontal direction. Then, the adhesive agent 50 is cured. Specifically, the adhesive agent is irradiated with ultraviolet rays, whereby the ultraviolet-curable adhesive agent 50 is cured (see FIG. 4B). Then, the lens substrate 40 is removed from the assembling table 60. In this way, the optical fiber and lens substrate assembly 10 shown in FIG. 1D can be completed. After removing the lens substrate 40 from the assembling table 60, by irradiating the adhesive agent 50 with ultraviolet rays, the ultraviolet-curable adhesive agent 50 may be cured.

The root-mean-square roughness Rq of the smooth surface 31 after performing the extra coarse, coarse, medium, fine, and finish polishing processes on the smooth surface 31 for evaluation and test in Step-120 is shown in Table 1. When the smooth surface 31 was observed, no great damage was observed on the cross section (exposed surface) of the optical fiber element wire 21 and the cross section (exposed surface) of the secondary coating 24 after the polishing process of the respective steps.

TABLE 1

| | Root-mean-square roughness Rq |
|---|---|
| Extra coarse polishing | 0.30 μm |
| Coarse polishing | 0.22 μm |
| Medium polishing | 0.18 μm |
| Fine polishing | 0.05 μm |
| Finish polishing | 0.05 μm |

Using the end-surface-fixing resin block 30 having the smooth surface 31 obtained in the respective steps of the extra coarse, coarse, medium, fine, and finish polishing processes, the optical fiber and lens substrate assembly 10 was manufactured. Then, optical loss of light which has entered from one end of the optical fiber core wire 20, been emitted from the cross section (exposed surface) of the optical fiber element wire 21 disposed on the smooth surface 31 of the end-surface-fixing resin block 30, and passed through the adhesive agent 50 and the lens substrate 40 was measured. As a result, the optical loss was 0.05 dB in the finish polished state (Rq=0.05 μm) and also was 0.15 dB in the extra coarsely polished state (Rq=0.30 μm), and very low optical loss was attained. That is, sufficiently low optical loss was attained even when the value of Rq was 0.1 μm or more.

As described above, in the first embodiment, the optical fiber core wire 20 is embedded in the end-surface-fixing resin block 30, and the secondary coating 24 as well as the optical fiber element wire 21 that constitutes the optical fiber core wire 20 are subject to the smoothing process. Thus, it is easy to handle the optical fiber core wire 20, and it is possible to automate the manufacturing process and to reduce the manufacturing cost. Moreover, the optical fiber core wire 20 is hardly damaged. Furthermore, it is basically not necessary to prepare a special alignment structure in the end-surface-fixing resin block 30 in order to realize alignment with the lens substrate 40. The outer dimensions or the like of the end-surface-fixing resin block 30 do not require particularly high accuracy. In addition, even when very small damage (cracks, irregularities, or the like) occurs in the optical fiber element wire 21 or the core 22, since the damaged portion is filled with the adhesive agent 50, no adverse effect may occur due to damage.

Second Embodiment

Figure 5A:
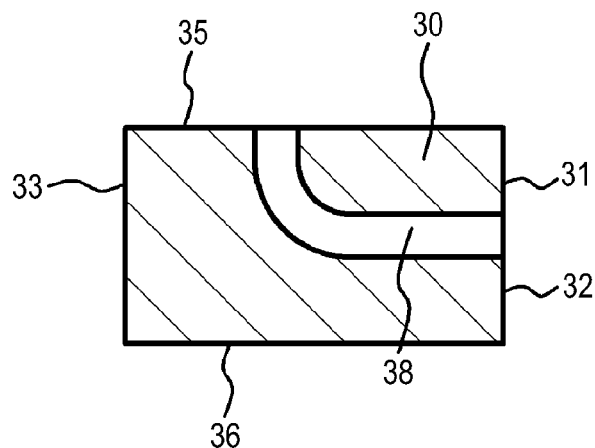
FIGS. 5A, 5B, and 5C are schematic cross-sectional views of an end-surface-fixing resin block according to a second embodiment of the present disclosure.
Figure 5B:
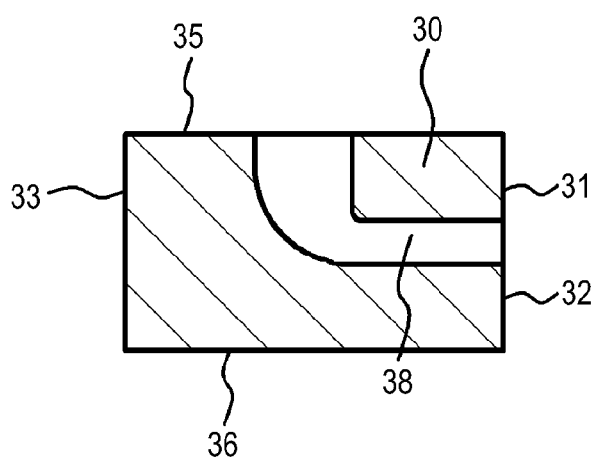
Figure 5C:
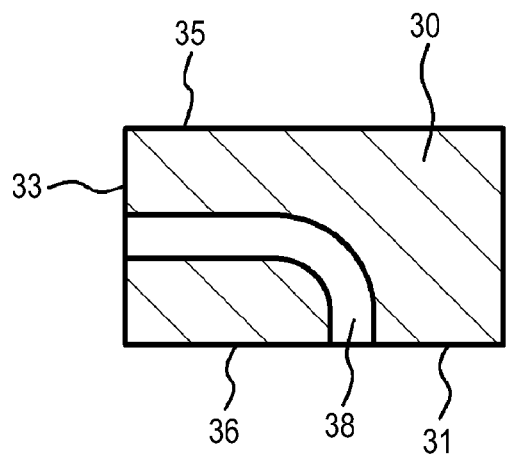

In the first embodiment, the linear through hole 37 is formed in the end-surface-fixing resin block 30. On the other hand, in the second embodiment, a through hole 38 which can be bent at a desired angle is formed in the end-surface-fixing resin block 30. That is, in this case, as shown in FIG. 5A or 5B showing the schematic cross-sectional view thereof, the through hole 38 extends from the smooth surface 31 corresponding to one side surface 32 of the end-surface-fixing resin block 30 to the front surface 35 while changing its angle by 90°, for example, in the inner side of the end-surface-fixing resin block 30. In the example shown in FIG. 5B, a concave portion larger than the optical fiber core wire is formed in the front surface 35, whereby a so-called open structure is realized. Alternatively, as shown in FIG. 5C showing the schematic cross-sectional view thereof, the through hole 38 extends from the smooth surface 31 corresponding to the bottom surface 36 of the end-surface-fixing resin block 30 to the side surface 33 while changing its angle by 90°, for example, in the inner side of the end-surface-fixing resin block 30. FIGS. 5A, 5B, and 5C are schematic cross-sectional views taken along the arrow C-C in FIG. 1A. Alternatively, both the linear through hole 37 and the through hole 38 bendable at a desired angle may be formed in the end-surface-fixing resin block 30.

Although the present disclosure has been described based on preferred embodiments, the present disclosure is not limited to these embodiments. In the embodiments, although the optical fiber core wire has been formed of a tape core wire of a 4-channel array, the optical fiber core wire may be formed of a tape core wire of a 2-channel array, a 12-channel array, or the like, for example. In some cases, an alignment hole (or a projection) may be formed in the smooth surface 31 of the end-surface-fixing resin block 30, and a projection (or an alignment hole) may be formed in the lens substrate 40. By inserting the projection into the alignment hole, the end-surface-fixing resin block 30 and the lens substrate 40 may be aligned with respect to each other.

The present disclosure contains subject matter related to that disclosed in Japanese Priority Patent Application JP 2011-047343 filed in the Japan Patent Office on Mar. 4, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical fiber and lens substrate assembly comprising:
   an optical fiber cable containing an optical fiber and a coating surrounding the optical fiber;
   a resin block in which at least an end portion of the optical fiber cable is embedded, a cross section of the optical fiber cable being exposed at a planar surface of the resin block; and
   a lens substrate attached to the planar surface of the resin block,
   wherein,
   the planar surface of the resin block has a root-mean square roughness from 0.05 μm to 0.5 μm, both inclusive.

2. The optical fiber and lens substrate assembly according to claim 1, wherein the planar surface of the resin block and the lens substrate are attached by an adhesive agent.

3. The optical fiber and lens substrate assembly according to claim 2, wherein the adhesive agent has approximately the same refractive index as the optical fiber.

4. The optical fiber and lens substrate assembly according to claim 1, wherein the optical fiber is formed of a tape core wire.

5. The optical fiber and lens substrate assembly according to claim 1, wherein a root-mean-square roughness Rq of the planar surface is 0.1 μm or more.

6. An optical fiber component comprising:
   an optical fiber cable with an optical fiber and a coating surrounding the optical fiber; and
   a resin block in which at least an end portion of the optical fiber cable is embedded, a cross section of the optical fiber cable being exposed at a planar surface of the resin block,
   wherein,
   the planar surface of the resin block has a root-mean square roughness from 0.05 μm to 0.5 μm, both inclusive.

* * * * *